P. MUELLER.
GAS COCK.
APPLICATION FILED JUNE 30, 1910.
1,045,094.
Patented Nov. 19, 1912.
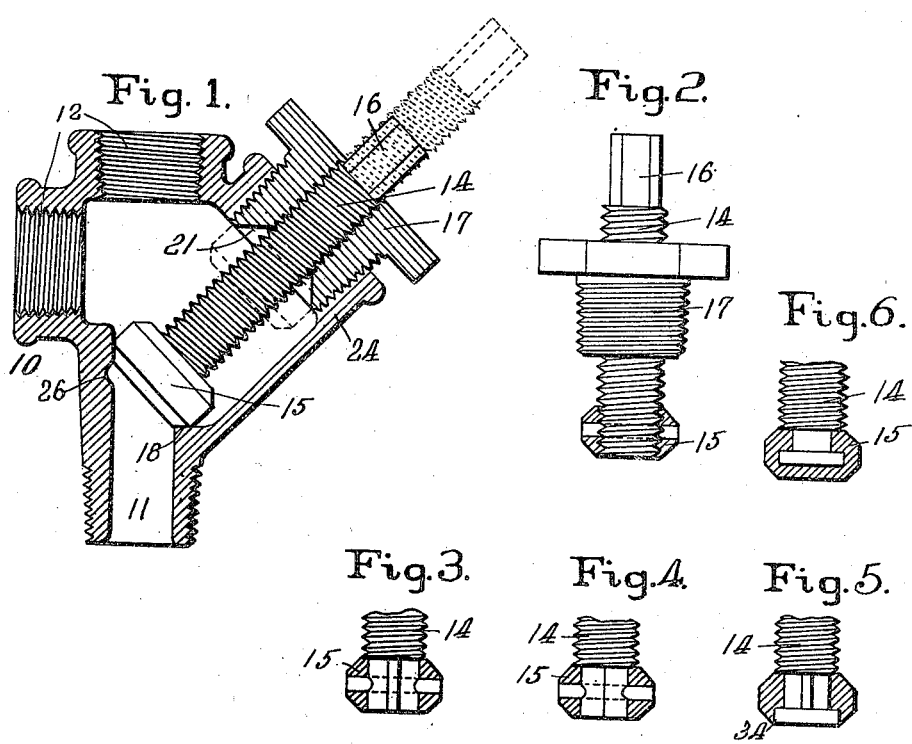
Witnesses.
Chester W. Hathaway.
Goldie M. Perry
Inventor.
Philip Mueller
by Meyers, Cushman & Rea
Attorney.

UNITED STATES PATENT OFFICE.

PHILIP MUELLER, OF DECATUR, ILLINOIS, ASSIGNOR TO H. MUELLER MANUFACTURING COMPANY, OF DECATUR, ILLINOIS, A CORPORATION OF ILLINOIS.

GAS-COCK.

1,045,094.

Specification of Letters Patent. Patented Nov. 19, 1912.

Application filed June 30, 1910. Serial No. 569,808.

*To all whom it may concern:*

Be it known that I, PHILIP MUELLER, a citizen of the United States, residing at Decatur, in the county of Macon and State of Illinois, have invented new and useful Improvements in Gas-Cocks, of which the following is a specification.

This invention relates to improvements in gas or other cocks, and has particular relation to devices of this character for use in connection with high pressure gas.

Among the objects of my invention are the provision of a gas cock so constructed as to substantially eliminate the liability of gas leakage, prevent corrosion of the interior mechanism, and to provide a simple and efficient valve structure which is removably insertible within the body of the cock, in which the valve is formed of lead or any other soft pliable material (metal, fiber, or composition), and in which the valve is movable between two opposing seats, the valve having its opposite faces formed to co-act with said seats.

To these and other ends, the nature of which will be readily understood as the invention is hereinafter disclosed, said invention consists in the improved construction and combination of parts hereinafter fully described, illustrated in the accompanying drawings, and particularly pointed out in the appended claims.

In the accompanying drawings, in which similar reference characters indicate similar parts in each of the views, Figure 1 is a longitudinal sectional view of a gas cock having two openings and a single gas inlet, said view illustrating the valve in closed position in full lines and in open position in dotted lines. Fig. 2 is a side elevation of the insertible valve construction, the valve being shown in section, and illustrating one way in which the valve is secured to its stem. Figs. 3, 4, 5 and 6 are views illustrating different ways in which the valve may be secured to its stem.

Referring to the drawings 10 designates a gas cock having a gas inlet 11, and two gas outlets 12, the inlet end of the cock being screw threaded and adapted to be inserted into a main or other gas conduit. The inner end of the gas inlet is formed to provide an angularly arranged valve seat 18, and in direct opposition to said seat the body portion of the cock is provided with an integral screw threaded angular neck 24 adapted to receive the threaded bushing 17, said bushing having a central screw threaded opening adapted to receive a screw threaded valve stem 14, the upper or outer end 16 of which is formed to permit engagement of a suitable tool for the purpose of imparting movement to the stem. The inner end of the stem 14 is provided with a valve 15, said valve being preferably formed of lead, or similar soft pliable metal, or fiber, or composition, having these qualities. The valve is preferably cast on the lower end of the stem, the latter having any preferred configuration for retaining the valve in position. For instance, in Fig. 2 the valve is shown as cast directly upon the screw threads of the stem; in Fig. 3 the lower end of the stem is formed circular in cross section and is provided with a radially extending rib, this construction preventing rotative movement of the valve on the stem; in Fig. 4 the lower end of the stem is shown as square in cross section, while in Fig. 5 the lower end is shown as formed with a construction somewhat similar to that shown in Fig. 3, but having a head 34 formed thereon by means of which the valve is retained against axial movement relative to its stem. The valve preferably has its upper and lower faces beveled, the lower face being adapted to engage the valve seat in a manner to prevent gas passage therethrough, while the opposite or upper face of the valve is adapted to enter an annular seat 21 formed on the inner end of the bushing 17, this latter construction providing against gas leakage through the inner portion of the cock in which the parts generally have movement. While the screw threaded connection of the bushing and valve stem forms an efficient closure, under ordinary circumstances, the closure is not good, when used in connection with gas of high pressure. By moving the lead valve to its seat in the recess 21 to firmly engage the walls thereof, an actual gas tight device is provided, it being understood that the bushing is rendered gas tight with respect to its connection with the body portion when the cock is assembled, and it being understood that similar conditions are had with respect to the connections of the body portions in the inlet conduit and the service pipe leading from the gas outlet.

The valve seat 18 is arranged angularly with respect to the plane of the outer end of the gas inlet and the body portion is recessed, as shown at 26, to provide for the movement of the material of the valve when being tightly closed onto its seat.

The construction herein results in a number of advantages which are believed to be valuable. Attention is called to the fact that it provides for the use of ordinary commercial iron fittings; that the only structure additional to that of the body portion is removable as a unitary structure; that the only portion of the cock in which provision can not be initially made against gas leakage (the screw threaded connection of stem and bushing) is rendered gas tight by the valve formed of a material which is soft and pliable, and that the entire device provides against either gas obstruction or corrosion by reason of the few parts within the cock, the material of which these parts are made, and the particular positions which are occupied by them. In addition it may be noted that inasmuch as the valve is cast upon the body of the stem, there is no liability of gas leakage on the periphery of the stem within the valve.

While I have described the best form of my invention now known to me, it is of course evident that many modifications may be made in the specific structure without departing from the generic spirit of my invention. I desire to cover all such modifications in the annexed claims.

What I claim is,—

1. A gas cock comprising a body portion having a gas inlet and a gas outlet, an angled valve seat at the inner end of the gas inlet, a valve structure removably inserted within said body portion perpendicular to said seat, said structure embodying a threaded bushing, a valve stem screw threaded within the bushing, a valve secured on and accurately fitting the lower end of the stem and adapted to be seated on said seat, said valve being formed of a soft pliable material, said bushing formed with its inner end to provide an annular seat surrounding the screw threaded stem, and said valve having its upper face formed to enter said seat and form a gas tight closure of the threaded connection of the stem and bushing when the valve is opened, an outlet opening in line with the inlet opening, and another outlet opening at right angles thereto.

2. A gas cock comprising a body portion having a gas inlet and a gas outlet, an angled valve seat at the inner end of the gas inlet, a valve structure removably inserted within said body portion, perpendicular to said seat, said structure embodying a threaded bushing, a valve stem screw threaded within the bushing, a valve secured on and accurately fitting the lower end of the stem and adapted to be seated on said seat, said valve being formed of a soft pliable material, said bushing having its inner end to provide an annular seat surrounding the screw threaded stem, and said valve having its upper face formed to enter said seat and form a gas tight closure of the threaded connection of the stem and bushing when the valve is opened, an outlet opening in line with the inlet opening, and another outlet opening at right angles thereto, and a valve receiving recess adjacent said seat adapted to receive the valve disk and allow it to entirely clear the fluid passageway.

3. A gas cock comprising a casing having an inlet and an outlet opening, a valve seat, an opening between the aforesaid openings, a stem passing into said casing on the outlet side of and perpendicular to said seat, an annular seat carried by the casing and surrounding the stem parallel to and in the same right line with said first-named seat, a valve disk of non-corrodible pliable material cast directly on said stem and coöperating with the first of said seats to close the cock, said stem being threaded substantially throughout its length, and said valve disk coöperating with the second of said seats to prevent the escape of gas around the stem when the cock is open, and a valve receiving recess adjacent said seat adapted to receive the valve disk and allow it to entirely clear the fluid passageway.

In testimony whereof I have hereunto set my hand in presence of two subscribing witnesses.

PHILIP MUELLER.

Witnesses:
W. R. GUSTIN,
W. R. BIDDLE.

---

Copies of this patent may be obtained for five cents each, by addressing the "Commissioner of Patents, Washington, D. C."